Fig. 2.
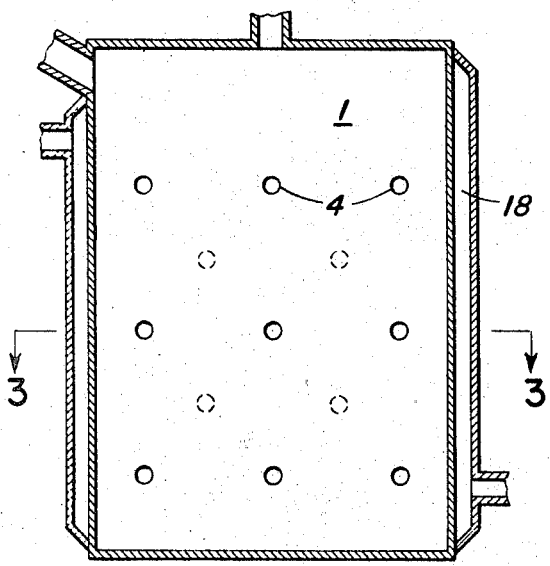
Fig. 3.
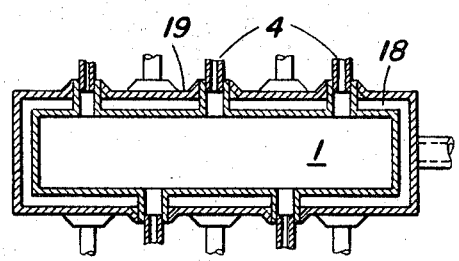
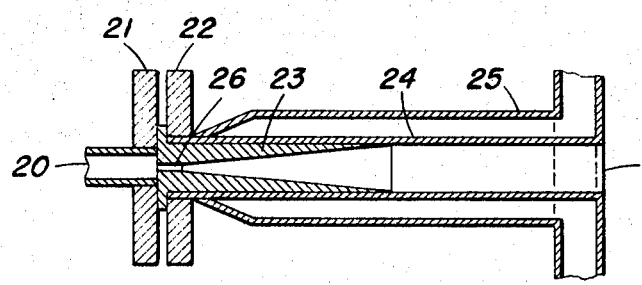
Fig. 4.
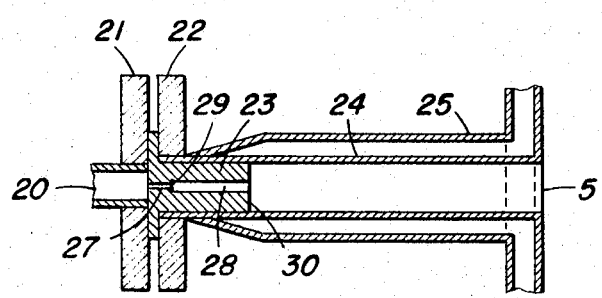
Fig. 5.
INVENTORS
Achim Kulling
Hans Steinbach
Hans Thumm
BY
AGENT

United States Patent Office 3,542,521
Patented Nov. 24, 1970

---

3,542,521
DEVICE FOR THE MANUFACTURE OF ALUMINUM CHLORIDE
Achim Kulling, Opladen, Hans Steinbach, Bergisch-Gladbach, and Hans Thumm, Leverkusen, Germany, assignors to Titangesellschaft m.b.H., Leverkusen, Germany, a corporation of Germany
Filed June 21, 1968, Ser. No. 738,968
Claims priority, application Germany, July 10, 1967,
T 34,281
Int. Cl. C01f 7/58
U.S. Cl. 23—277                 6 Claims

ABSTRACT OF THE DISCLOSURE

This invention is concerned with apparatus for the manufacture of aluminum chloride from aluminum metal and chlorine. The apparatus comprises a vertical reactor embodying heat exchangers to control the temperature of reaction between chlorine gas and a static bed of aluminum metal particles the chlorine being introduced into the reaction zone of the reactor through a plurality of nozzles mounted in the vertical walls of the reactor whereby local overheating is prevented. In such an apparatus low cost granular aluminum metal may be used as the bed material.

BACKGROUND OF THE INVENTION

Anhydrous aluminum chloride is an important material in the manufacture of titanium dioxide by the reaction of titanium tetrachloride with oxygen in a flame, wherein the rutile formation is promoted by the addition of aluminum chloride and the pigmentary properties are improved.

It is known to manufacture aluminum chloride in such a way that gaseous chlorine is reacted with solid aluminum metal at elevated temperatures, wherein the aluminum metal is arranged within a reactor as an immobile charge (designated below as "static bed") which charge is permeated by flowing chlorine. The aluminum chloride is in gaseous form in this reaction.

The reaction between aluminum metal and chlorine is strongly exothermic. For this reason it has been difficult to control and local overheating occurs frequently. The aluminum metal sinters or melts forming fairly large lumps which impede the reaction and aggravate the charging of additional aluminum metal into the reactor. Moreover alloy is sometimes formed between the material of the reactor wall and the molten aluminum thus damaging the reactor. In addition, corrosion by the hot gases containing chlorine occurs at overheated spots as a consequence of which the aluminum chloride may be contaminated by the reactor material. At colder places in the reactor aluminum chloride condenses and this causes clogging. For these reasons adequate temperature control is of the utmost importance for carrying out the reaction.

In U.S. Pat. No. 2,385,505 it is suggested that a vertically arranged lengthy uncooled reactor be filled with aluminum pieces and that chlorine be introduced from below through a narrow pipe to which definite amounts of aluminum chloride have been admixed for controlling the reaction. To this end the mixture of chlorine and aluminum chloride are passed through the ducts at increased pressure and elevated temperature so that the aluminum chloride either does not condense at all or else separates out in liquid form. In this process the chlorine is poorly distributed in the static aluminum bed. Furthermore, special devices are needed for the preparation of the chlorine-aluminum chloride mixture, wherein its temperature and composition must be changed inside the reactor, depending on the prevailing conditions. The application of increased pressure is concomitant with high apparatus costs.

According to another suggestion (U.S. Pat. No. 3,078,145) the pieces of aluminum metal are placed on a perforated plate through which the chlorine flows from below. If on account of too great a supply of chlorine, local overheating occurs, then a small part of the aluminum melts and flows through the perforated plate and collects below it. The chlorine therefore first comes in contact with the accumulated aluminum and is partly consumed so that the reaction is diminished on the perforated plate by the reduced chlorine supply. The control of the reaction is difficult. If especially corrosion resistant materials are not employed, considerable corrosion occurs caused by the molten aluminum.

It is of great importance for the continuous manufacture of titanium dioxide to maintain over an extended period a uniform controllable current of aluminum chloride. This problem has not been solved in a satisfactory manner by the processes just described.

In addition, the reaction may be controlled in a somewhat adequate manner only if the aluminum metal is not present in pieces that are too small. The smaller the aluminum pieces are, the greater is their specific surface and the more violent is the reaction. Large pieces of aluminum are obtainable but they are costly since they can only be manufactured by a complicated procedure. On the other hand, granular aluminum is available in commerce and therefore relatively low-priced. Thus, its employment is desirable.

SUMMARY OF THE INVENTION

It has been discovered that the reaction between aluminum metal and chlorine gas may be carried out using the instant apparatus which employs granular aluminum metal as the bed material in a reactor which is fitted with a heat exchange system. The latter comprises fluid-cooled surfaces which are spaced apart no more than about 80 mm. In one embodiment of the invention the heat exchange system comprises the double, spaced fluid-cooled walls of a cylindrical reactor having a fluid-cooled probe projecting upwardly in the center thereof. In a second embodiment of the invention the double, spaced fluid-cooled walls of a substantially rectangular reactor constitute the heat exchange system.

The chlorine gas is fed into the bed of granular aluminum metal by a plurality of nozzles mounted on the exterior walls of the reactor and extending inwardly therethrough to the reaction zone of the reactor.

DESCRIPTION OF THE DRAWINGS

FIG. 2 is a vertical elevation in section of a modification of the aluminum chloride generator wherein the latter is rectangular in cross section;

FIG. 3 is a transverse section of the generator of FIG. 2 on line 3—3 of FIG. 2;

FIG. 4 is an enlarged elevation in section of one form of chlorine gas nozzle for use with the generator of FIGS. 1 and 2 the nozzle of FIG. 4 having a smooth, expanding tapered bore; and FIG. 5 is an enlarged elevation in section of a modified chlorine gas nozzle wherein the bore is expanded in a plurality of abrupt steps.

DESCRIPTION OF THE PREFERRED EMBODIMENT

Figure 1:
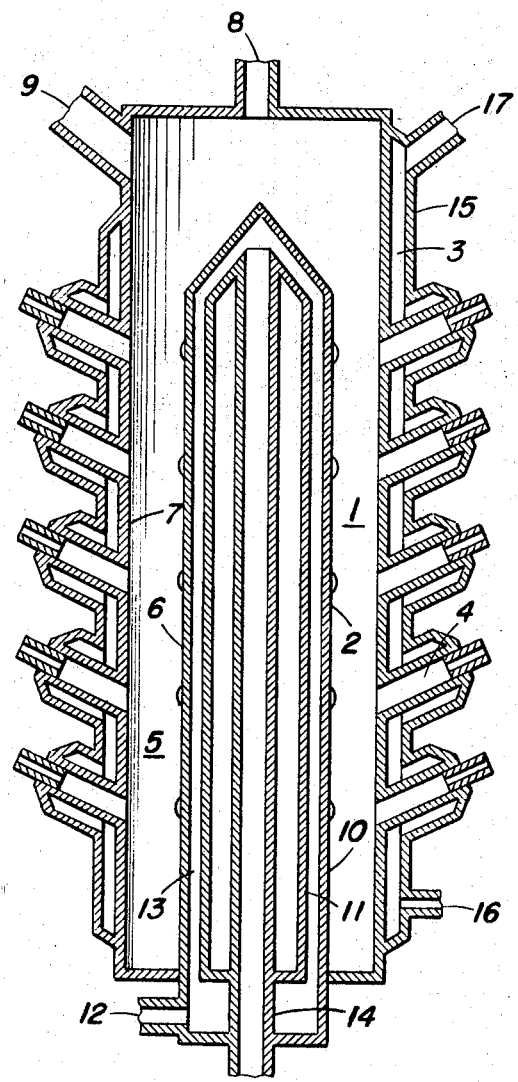
FIG. 1 is a vertical elevation in section of an embodiment of the aluminum chloride generator of this invention wherein the generator is circular in cross section, showing details of the heat exchange system and the chlorine gas feed nozzles.

In this novel apparatus for the manufacture of aluminum chloride from aluminum metal and chlorine gas, the bed employed in the reactor is composed of low cost aluminum metal granules. The reaction is carried out in a vertically positioned reactor which is fitted with a heat exchange system comprising fluid-cooled surfaces in the reaction space and characterized in that said surfaces are spaced apart so that the distance between the surfaces is no more than 80 mm. from one another. In addition the chlorine gas is introduced into the reaction space through the vertical sidewalls of the reactor from the outside thereof by means of numerous diffuser-like nozzles. The reaction space is understood to be the part of the reactor in which the reaction takes place.

The process according to the invention provides a method for generating a uniform, controllable current of aluminum chloride vapor over an extended period of time. The reaction may be easily controlled in spite of the small size of the granules since local overheating is reliably prevented.

The chlorine gas is added from the outside through the nozzles positioned at numerous places in the sidewalls. A local reaction zone is formed at the opening of each nozzle and in order to avoid overheating in these local reaction zones, an excessive amount of chlorine must not be introduced through the individual nozzles. However in order to achieve a large throughput of chlorine gas, a plurality of nozzles are mounted uniformly in the walls of the reactor. Further it is essential to remove the heat of reaction from the reaction space and it has been found that this can be effectively accomplished by maintaining the distance between the nozzle outlets and the opposite cooling surface of the reactor not in excess of 80 mm. Also the dissipation of heat from the local reaction zones is aided by the cooling surfaces immediately adjacent the nozzles.

The reactor is of simple construction and has smooth inside walls so that the aluminum granules slide easily downward, corresponding to the consumption. The nozzles for the introduction of chlorine are attached to the outside of the reactor and therefore are easily attainable. The distance between the fluid-cooled walls is preferably kept small so that a good cooling effect is obtained, as is absolutely necessary in the employment of granular aluminum owing to their relatively large surface.

When employing chemically pure granulated aluminum, the aluminum chloride formed is very pure and only a slight residue is formed in the chlorination.

The shape of the nozzles through which the chlorine is introduced is also an essential feature of the invention. In order to achieve an efficient and controlled distribution of chlorine from the individual nozzles each must have a small axial bore. However, the currents of chlorine issuing from the nozzles must not have too great velocity when entering the reaction space because otherwise an injector effect is created which carries the aluminum chloride into the small bores of the nozzles and forms deposits therein which tend to grow and finally clog the nozzles. As soon as several nozzles are clogged, larger volumes of chlorine flow rapidly into the reactor through the other nozzles and local overheating is produced. It has been found however that the formation of this deposit does not occur at the nozzles provided the nozzle-bores are enlarged in the shape of diffusers, prior to their point of entry into the reactor space. This widening of the nozzle bores produces a slowing up of the chlorine, thus counter-acting the injector effect, as a consequence of which no aluminum chloride reaches the small bore section of the nozzles.

The diameter of the small bore section of each nozzle should not be less than 1 mm. since with smaller diameters an unnecessary loss of pressure occurs. The chlorine may be introduced at a pressure of less than 1 atm. overpressure.

The nozzles may be introduced into the reaction space horizontally. However, it is of particular advantage if they are directed downward at an angle from the horizontal. This arrangement avoids the entering of aluminum granules into the nozzle openings and causing trouble there.

It is advantageous to cool the nozzles by providing them with fluid-cooled jackets; the fluid-cooling of the nozzles may be combined with the fluid-cooling of the reactor walls.

The number and the distribution of the nozzles for the introduction of chlorine is also an important feature in carrying out the process according to the invention. In order to obtain a good distribution of the chlorine in the bed of solids and to keep the amount of chlorine passing through each nozzle at a low rate, a minimum number of nozzles is required. This number depends on the size of the reaction space and on the total chlorine thruput.. The larger the reaction space and the larger the total chlorine thruput, the more nozzles must be provided. However, there is a maximum number of these nozzles which may be employed. Aside from the fact that too great a number of nozzles means increased costs, care must be taken that the nozzles are not arranged so close to one another that the individual reaction zones overlap in the bed of solids, At such places overheating may occur. The mutual minimum distance between the individual nozzles for the introduction of chlorine is inter-related with the chlorine thruput per nozzle; i.e. the higher the chlorine thruput is per nozzle, the greater is the required minimum distance between the nozzles.

The reactor contains in its upper part a hopper through which granulated aluminum may be charged into the reactor without interruption of the process; there is also a discharge duct for the aluminum chloride formed. This $AlCl_3$ may be introduced directly into a plant, for example, for the manufacture of titanium dioxide from titanium tetrachloride and oxygen.

A device suitable for carrying out the process consists of a vertically arranged reactor fitted with a heat exchange system, comprising fluid-cooled heat exchange surfaces in the reaction space spaced a maximum distance of 80 mm. from each other. In this particular reactor the reactor walls themselves comprise heat exchange surfaces. Mounted in the reactor walls are a plurality of nozzles having enlarged diffuser-like discharge ports for discharging the chlorine into the reaction space, each nozzle penetrating the walls of the reactor into the reaction space and being surrounded by a heat exchange system. The reactor at its upper end is fitted with a device for adding aluminum granules into the reaction space and a discharge duct for the aluminum chloride vapor.

FIG. 1 shows one type of apparatus for carrying out the reaction. This apparatus consists of a cylindrical reactor 1 the heat exchange system of which consists of two parts; the one being a fluid-cooled probe 2 arranged centrally in the reactor 1; the other part 3 comprising the fluid-cooled walls of the reactor 1. Extending from the exterior of the reactor walls inwardly into the reaction space of the reactor are a plurality of nozzles 4 for supplying chlorine to the reaction space 5. The distance between the fluid-cooled surfaces 6 and 7 of the probe 2 and the reactor wall, respectively, is at maximum 80 mm. At its upper end the reactor 1 is fitted with a feed device 8 for charging granulated aluminum into the reaction space; and with a discharge duct 9 for the aluminum chloride vapor produced. The centrally arranged probe 2 consists of a cylindrical outer shell 10 the top of which is in the shape of a closed conical point; and a cylindrical double-walled insert 11 the top of which is also conical.

Through a duct 12 a heat exchange medium is introduced into the probe 2 in which it flows upwardly through the intermediary space 13 between the exterior shell 10 and the double-walled insert 11 to the top thereof and from thence passes downwardly and is discharged from the base of the probe through the pipe 14.

As mentioned above the heat exchanging device 3 comprises the spaced walls 7 and 15 of the reactor through which a heat exchanging medium is circulated via inlet 16 and outlet 17.

The nozzles 4 for introducing the chlorine gas pass through the fluid-cooled, double, spaced walls of the reactor prior to opening up into the reaction space 5. In this way their temperature is controlled in the same manner as the reactor temperature. The fluid-cooled walls may be formed advantageously in such a way that they include the portions of the nozzles that project outwardly from the reactor wall. The hopper device 8 and the discharge duct 9 may also be included within the heat exchange system.

Commercial liquids may be employed as heat exchange media.

Another suitable form of the device is shown in FIGS. 2 and 3 FIG. 3 being a transverse section of FIG. 2 on line 3—3 of FIG. 2. In this modification the reactor 1 is rectangular in cross-section and has double, spaced walls which provide a heat exchange system 18. Mounted in the broad sides 19 of the reactor are numerous nozzles for feeding chlorine 4 into the reactor the nozzles being arranged in such a way that in each case the discharge opening of a nozzle on one side of the reactor is opposite the interspace of several nozzle discharge openings on the other side of the reactor. The sides 19 of the reactor may be of any desired width but the shorter ends are 80 mm. long at maximum so that the two sides 19 of the reactor are spaced apart no more than this maximum distance.

In the devices shown in FIGS. 1–3 the cross-section of the reaction space is the same over its entire height. However, the reactor may also be formed in such a way that the cross-section of the reactor space increases from the top towards the base. This modification has the advantage that the aluminum granules slide more easily from the top towards the base and that built-in compartments, if and when provided within the granulated aluminum charge, may be dismantled more easily in the direction of the base.

Referring now to the nozzles 4 each is provided with an axial bore which may be widened by means of a gradual taper or else by one or more steps.

FIG. 4 shows for example a nozzle the bore of which is gradually tapered. At its outer end is a chlorine introduction tube 20 to which an insert 23 is fastened by means of two flanges 21 and 22. The greater part of this insert is located in a pipe 24 which is the inner wall of the double, spaced wall of the nozzle the mantle 25 being the outer wall which forms a heat exchange system with the inner wall 24. The insert 23 has a narrow bore 26 at its entrance end which expands conically to a diameter at its opposite end corresponding to the inner diameter of the pipe 24. By means of the pipe 24 the small bore 26 of the insert is supported at a distance from the reaction space so that its small bore 26 is protected against the hot reaction gases.

A nozzle having a bore expanded by steps is shown for example in FIG. 5. It is constructed similarly to the nozzle shown in FIG. 4, except that the insert 23 has a bore of different shape. Thus it comprises a narrow cylindrical bore 27 at its entrance end followed by a wider cylindrical bore 28, the diameter of which is however essentially smaller than the inner diameter of the pipe 24. The expansion of the nozzles thus takes place by means of the steps 29 and 30.

In the nozzles shown in the FIGS. 4 and 5, the inserts 23 may be easily replaced if required.

EXAMPLE

An apparatus similar to FIG. 1 was employed.

The cylindrical reactor 1 consisted of double, spaced walls of nickel and had a height of 2600 mm. and an inner diameter of 300 mm. The center probe 2 had a height of 1600 mm. and an outer diameter of 206 mm. The distance between the two heat exchanging walls 6 and 7 was 47 mm. Into the reaction space 5 there opened 30 nozzles 4 for introducing chlorine through the side walls of the reactor. They were arranged in 5 rows of 6 nozzles each staggered from row to row; the lowest row was 300 mm. above the bottom of the reactor and the distance of the individual rows was 200 mm. from each other. The nozzles opened into the reaction space at a downward slope of 15° from the horizontal and were constructed as shown in FIG. 5.

The cylindrical bores in each nozzle had diameters of 1.5 mm., 4 mm. and 20 mm. The step 30 was 100 mm. and the step 29 145 mm. distant from the place where the nozzle opened into the reaction space. The hopper device 8 for the aluminum metal and the discharge pipe 9 for the aluminum chloride were also included in the heat exchange system.

The reactor 1 was filled with 210 kg. of low cost aluminum granules which had sizes from 5 to 10 mm. 2.8 cu. m./hr. of a diphenyl - diphenyl oxide mixture were passed through the heat exchange system. The mixture was heated to 180° C. 4.1 standard cu. m./hr. chlorine were introduced through the nozzles 4. Immediately a complete reaction took place. By choking or stopping the heat and cooling with air, the heat exchange medium was maintained at a temperature of 180–210° C. The temperature in the reaction space was about 500° C. At the discharge pipe 9 a uniform current of aluminum chloride of 16.3 kg./hr. aluminum chloride was recovered. Corresponding to the consumption, 50 kg. granulated aluminum were added every 15 hours.

Depending on the requirement, the content of aluminum chloride in the vapor current could be conveniently adjusted within a range of 7 and 22 kg./hr. aluminum chloride by modifying the chlorine addition. The reaction could also be interrupted easily by stopping the chlorine intake. In this case it is necessary to pass, instead of chlorine, an inert gas, e.g., nitrogen, through the reactor for some time in order to remove residues of aluminum chloride since otherwise the nozzles might clog.

The free chlorine which was possibly present, as the case might be, in the current of aluminum chloride at incomplete reaction was determined for controlling the reaction. For this purpose the current was passed through a basket charged with aluminum lumps and the temperature was measured. A temperature rise in the basket was to indicate the presence of chlorine.

The reaction ran to completion and no disturbances occurred in the course of several days.

While this invention has been described and illustrated by the examples shown, it is not intended to be strictly limited thereto, and other variations and modifications may be employed within the scope of the following claims.

What is claimed is:

1. Apparatus for producing gaseous aluminum chloride comprising a reactor, means arranged to feed aluminum metal granules into said reactor to form a static bed of aluminum metal granules, a plurality of gas nozzles mounted in the wall of said reactor in a plurality of vertically spaced planes between the top and bottom of said static bed for feeding gaseous chlorine into said static bed of aluminum metal granules throughout the height of said bed to react therewith and form gaseous aluminum chloride, means to exhaust said gaseous aluminum chloride from said reactor and heat exchange means comprising a central probe arranged to project upwardly into said static bed from the bottom thereof and spaced no more than 80 mm. from the surrounding walls of said reactor to maintain a uniform distribution of heat throughout said static bed during said reaction.

2. Apparatus for producing gaseous aluminum chloride according to claim 1 wherein said gas nozzles are mounted on the outer wall of said reactor in substantially uniformly spaced relationship and arranged to extend through the wall of said reactor at an acute angle to the vertical axis thereof to introduce gaseous chlorine substantially uniformly throughout said static bed.

3. Apparatus for producing gaseous aluminum chloride according to claim 1 wherein said reactor is substantially circular in cross section and said heat exchange means comprises the walls of said reactor in combination with said central probe, both said walls and said probe having fluid passages for circulating a fluid coolant therethrough.

4. Apparatus for producing gaseous aluminum chloride according to claim 2 wherein said gas nozzles are constructed and arranged to be continuously cooled and the axial bores of said nozzles are arranged to increase in diameter from the outer ends thereof to the inner ends within said reactor.

5. Apparatus for producing gaseous aluminum chloride according to claim 4 wherein the axial bore of each nozzle is increased in diameter by means of a uniform taper.

6. Apparatus for producing gaseous aluminum chloride according to claim 4 wherein the axial bore of each nozzle is increased in diameter by means of successive bores of progressing larger diameter.

References Cited
UNITED STATES PATENTS

| | | | |
|---|---|---|---|
| 1,619,022 | 3/1927 | Hall | 23—95 |
| 1,698,324 | 1/1929 | Taveau et al. | 23—94 |
| 3,243,282 | 3/1966 | McGeer | 23—283 XR |
| 1,630,283 | 5/1927 | Waggaman et al. | 23—277 XR |

JAMES H. TAYMAN, Jr., Primary Examiner

U.S. Cl. X.R.

23—92, 281, 284; 165—141, 142, 169